J. R. HYDE.
BOLT AND NUT LOCK.
APPLICATION FILED FEB. 9, 1914.
1,166,049.
Patented Dec. 28, 1915.
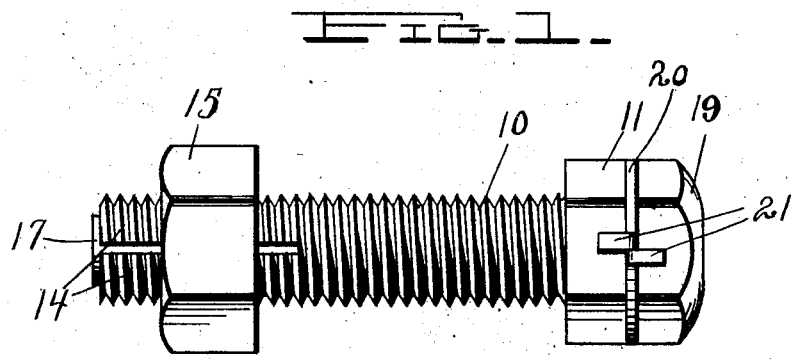
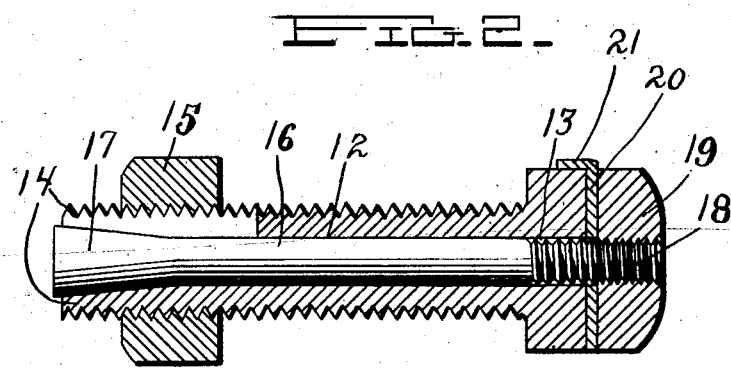
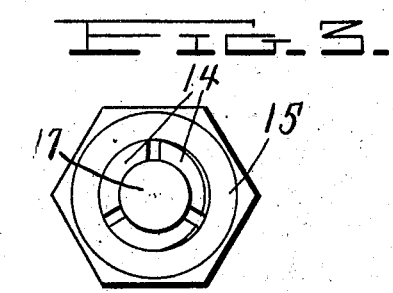
Inventor
J. R. Hyde

UNITED STATES PATENT OFFICE.

JOHN RICHARD HYDE, OF YOUNGSTOWN, OHIO.

BOLT AND NUT LOCK.

1,166,049.   Specification of Letters Patent.   Patented Dec. 28, 1915.

Application filed February 9, 1914.   Serial No. 817,601.

*To all whom it may concern:*

Be it known that I, JOHN R. HYDE, a citizen of the United States, residing at Youngstown, in the county of Mahoning, State of Ohio, have invented certain new and useful Improvements in Bolt and Nut Locks; and I do hereby declare the following to be a full, clear, and exact description of the invention, such as will enable others skilled in the art to which it appertains to make and use the same.

This invention relates to improvements in nut and bolt locks.

One object of the invention is to provide a simple and novel means for expanding a bolt to cause a frictional binding between the threads of the nut and bolt.

Another object is to provide a bolt and novel means for providing a binding action between the nut and bolt, in connection with which is a novel means for locking the binding producing means.

Other objects and advantages will be apparent from the following description, when taken in connection with the accompanying drawings.

In the drawings: Figure 1 is an elevation of my improved nut and bolt locking device. Fig. 2 is a vertical longitudinal sectional view therethrough. Fig. 3 is an end view.

Referring particularly to the accompanying drawings, 10 represents a bolt which is threaded practically throughout its entire length, and is provided with a wrench engaging head 11. The bolt is provided with a bore throughout the length as indicated at 12, this bore being reduced as at 13, said reduced portion passing through the head 11. The opposite end of the bolt is kerfed longitudinally to form the flexible sectors 14. Engaged on this kerfed end of the bolt is a nut 15.

Extending longitudinally through the bore of the bolt 10 is an expansion bolt 16, this bolt being provided with a tapering head 17 which is arranged within the kerfed end of the bolt. The opposite end of the expansion bolt extends through the smaller bore 13 where it is provided with a threaded portion 18 to receive a nut 19 thereon.

Between the head 11 and the nut 19 is a washer plate 20 which is formed on one side with a pair of tongues 21, one of which is adapted to be bent to engage one of the side faces of the head 11 and the other bent in the opposite direction to engage against one of the faces of the nut 19. This will prevent rotation of the nut 19 which would tend to loosen the expansion bolt and permit the nut 15 to be easily turned. It will thus be seen that by tightening the nut 19, the expansion bolt will be drawn longitudinally in the bore 12 to cause the tapered sides of the head 17 thereof to bear against the segments 14 and force them outwardly into binding engagement with the nut 15. The nut 19 being prevented from rotation by the washer 20 retains the expansion bolt in proper position so that danger of accidental rotation of the nut 15 is eliminated.

What is claimed is:

In a nut and bolt locking device, a bolt having a longitudinal bore formed therethrough, a head on one end of the bolt formed with a central longitudinal bore communicating with the first named bore but of smaller diameter, the opposite end of the bolt being longitudinally kerfed to form resilient sectors, an expansion bolt disposed longitudinally through the said bores and having a tapered head engaging the sectors from within the bolt, the other end of the expansion bolt being threaded and provided with a clamping nut, and a washer between the nut and head of the bolt provided with tongues bent against the nut and bolt head to prevent rotation of said nut.

In testimony whereof, I affix my signature in the presence of two witnesses.

JOHN RICHARD HYDE.

Witnesses:
 R. GORDON REEBEL,
 THOMAS W. HAMLEY.